United States Patent [19]
Knuuttila et al.

[11] Patent Number: 5,880,055
[45] Date of Patent: Mar. 9, 1999

[54] CATALYST FOR POLYMERIZATION OF ETHYLENE

[75] Inventors: Hilkka Knuuttila, Porvoo, Finland; Pekka Sormunen, Charlottenlund, Denmark; Eero Iiskola, Porvoo, Finland; Eeva-Liisa Lakomaa, Espoo, Finland; Harri Hokkanen, Helsinki, Finland

[73] Assignee: Neste Oy, Espoo, Finland

[21] Appl. No.: 843,610

[22] Filed: Apr. 10, 1997

Related U.S. Application Data

[63] Continuation of Ser. No. 301,495, Sep. 7, 1994, abandoned.

[30] Foreign Application Priority Data

Sep. 10, 1993 [FI] Finland ..................... 933998

[51] Int. Cl.⁶ ..................... B01J 37/00
[52] U.S. Cl. ..................... 502/103; 502/104; 502/113; 502/117; 502/118; 427/248.1; 427/255; 427/255.7
[58] Field of Search ..................... 502/103, 104, 502/113, 117, 118, 242, 263; 427/248.1, 255, 255.7

[56] References Cited

U.S. PATENT DOCUMENTS

| | | | |
|---|---|---|---|
| 4,110,410 | 8/1978 | Ryu | 260/683.15 B |
| 4,459,372 | 7/1984 | Arena | 502/351 |
| 4,465,782 | 8/1984 | McKenzie | 502/104 |
| 4,562,170 | 12/1985 | Graves | 502/113 |
| 5,070,055 | 12/1991 | Schramm et al. | 502/107 |
| 5,155,079 | 10/1992 | Cribbs et al. | 502/113 |
| 5,183,794 | 2/1993 | Knuuttila et al. | 502/242 |

FOREIGN PATENT DOCUMENTS

| | | | |
|---|---|---|---|
| 345856 | 12/1989 | European Pat. Off. | B01J 21/06 |
| 0438132 | 7/1991 | European Pat. Off. | |
| 0525503 | 2/1993 | European Pat. Off. | |
| 1420589 | 11/1971 | Germany . | |

*Primary Examiner*—Shrive Beck
*Assistant Examiner*—Timothy Meeks
*Attorney, Agent, or Firm*—Birch, Stewart, Kolasch & Birch, LLP

[57] ABSTRACT

The present invention concerns heterogeneous catalysts for polymerization of olefins. The catalysts include at least one Group IVa metal compound on a solid inorganic oxidic support. According to the invention the catalysts are prepared by vapourizing at least one solid Group IVa metal halide compound and routing the vapour of the metal halide compound into a reaction chamber, wherein the vapour is reacted with the support at a temperature of about 250° to about 450° C. in order to bind said metal halide compound to said support. Any metal compound not bound to said support as well as any volatile reaction products emanating from the reaction between said metal halide compound and said support are then removed from the reaction chamber in the vapour phase. Optionally, the product obtained is treated with an organic aluminum compound to increase the catalytic activity of said catalyst. The catalysts thus prepared are very well suited for polymerization of ethylene or copolymerization of ethylene with other alpha-olefins, such as propylene, butylene, 4-methyl-1-pentene and hexene. A polymerization process employing the novel catalyst will provide products of the Ultra High Molecular Weight-type (UHMWPE) having very broad MWD.

15 Claims, 4 Drawing Sheets

Preheating: 300°C
Reaction: 300°C

Preheating: 600°C
Reaction: 300°C

Preheating: 600°C
Reaction: 550°C

CATALYST FOR POLYMERIZATION OF ETHYLENE

This application is a continuation, of application Ser. No. 08/301,495 filed on Sep. 7, 1994, now abandoned.

BACKGROUND OF THE INVENTION

1. Field of the Invention

The present invention relates to a process for preparing polymerization catalysts for olefins. Said catalysts are particularly suited for the polymerization of ethylene.

The present novel polymerization catalysts comprise a support consisting of an inorganic oxide or a mixture of inorganic oxides, the surface of said support having a Group IVa metal compound bound to its surface.

Furthermore, the present invention concerns a process for the homo- and copolymerization of olefins, in particular ethylene, in the presence of a heterogeneous catalyst.

2. Description of Related Art

It is known in the art that oligomerisation and polymerisation of ethylene can be catalysed by compositions comprising vanadium, titanium and/or zirconium halides and possibly other components on an inorganic oxidic support. Typically, these heterogeneous catalysts are prepared by stirring the support, for instance silica or alumina, in a solution of the transition metal compound(s) used, evaporating the product and, if desired, suspending it in a solution of a suitable cocatalyst compound, such as an organo-Al compound, before polymerization.

The prior art is hampered by considerable problems. For example, the use of solvents makes the processes complex because additional process steps (evaporation) are needed for separating the solvents from the products. Furthermore, as far as the preparation of Zr- and Hf-containing catalysts using chlorides is concerned, the reagents are solid substances, which are poorly soluble in non-polar solvents. Therefore, polar solvents, such as water and alcohols, will have to be used as reaction media. These solvents are, however, known to impair the activity of the catalysts.

SUMMARY OF THE INVENTION

It is an object of the present invention to eliminate the problems of the prior art and to provide novel zirconium chloride-based catalysts, as well as novel processes for preparing supported Group IVa metal catalysts, and for polymerization of olefins.

The present invention is based on the concept of evaporating the Group IVa metal reagent, preferably a Group IVa metal halide, separately from the support and routing the vapour into a reaction chamber, wherein the vapour is reacted with the support. During the reaction, the support is kept at a temperature which is higher than the condensation temperature of the vapour and simultaneously so high as to achieve the thermal activation energy necessary for establishing chemical bonds between the metal compound and the support (chemisorption of the metal compound).

DETAILED DESCRIPTION OF THE INVENTION

Figure 1:
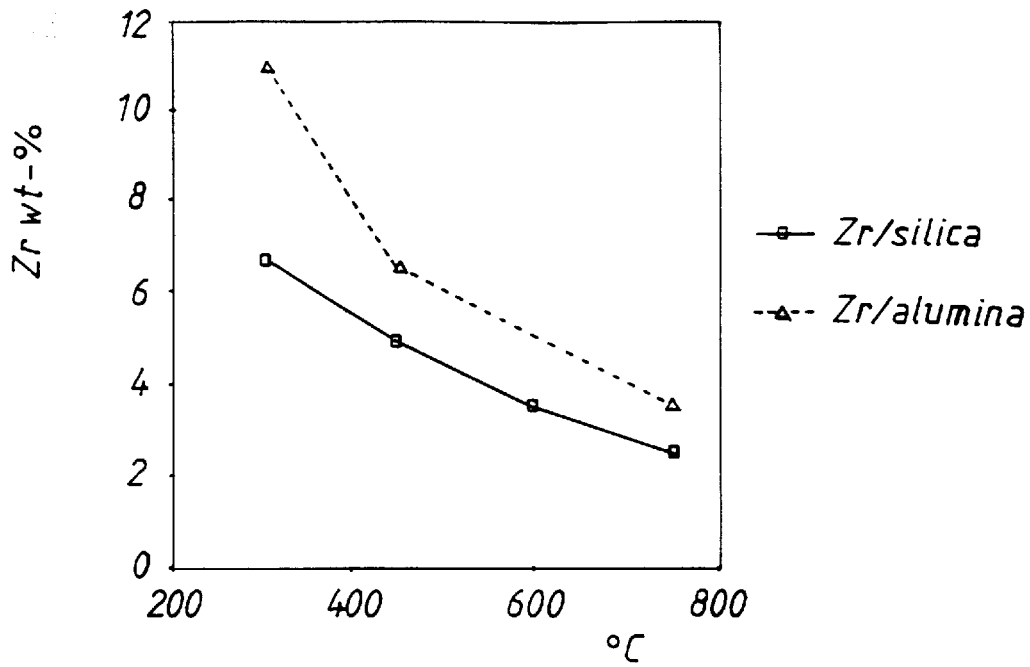
FIGS. 1 and 2 show the binding of $ZrCl_4$ as a function of the preheating temperature of the support.

The present catalysts comprise compounds, in particular halides, of one or more Group IVa metals deposited from the vapour phase on an oxidic support. Should the catalysts contain only one metal compound, then that compound is selected from the group consisting of the fluorides, chlorides, bromides and iodides of zirconium and hafnium. Likewise, if there are several metal compounds, then at least one of those compounds is selected from the group of compounds listed above. The oxidic supports are preferably selected from the group consisting of silica and alumina.

According to a preferred embodiment, the novel zirconium chloride catalyst provided by the present invention comprises an essentially amorphous zirconium compound of the formula $ZrY_x$, wherein Y is a halo, preferably chloro or bromo, and x is 2 or 3, on an oxidic support selected from the group consisting of silica and alumina. From instrumental analysis of the catalysts it appears that, for instance, the zirconium chloride has reacted with the hydroxyl groups on the surface of the support, resulting in direct chlorination of the OH groups. Therefore, depending on whether the zirconium chloride molecule has reacted with one or two OH groups, the formula of the zirconium species bound to the support is either $ZrCl_3$ or $ZrCl_2$. Because of the reaction, HY is released. The novel catalyst is capable of catalyzing the homo- and copolymerization of ethylene. According to one embodiment, the catalysts are capable of catalyzing ethylene polymerization in the gas phase at an increased pressure of at least 2000 kPa, producing polyethylene having a broad molecular weight distribution, the polydispersity being at least 15.

According to the process of the present invention, the catalysts are prepared by vaporizing suitable Group IVa metal compounds and reacting the vapours with an oxidic support so as to deposit them thereon. For the vaporization of zirconium and hafnium it is particularly preferred to use solid halides, in particular halides selected from the group consisting of $ZrCl_4$, $ZrBr_4$, $HfCl_4$ and $HfBr_4$. It has surprisingly been found that many organic zirconium and hafnium compounds, which have suitable boiling points, cannot be used in the present invention because they tend to decompose in the vapour phase. However, the halides of the same elements, which are solid substances at ambient temperature, are readily vaporized at temperatures above 250° C. and are stable up to 500° C. One preferred embodiment of the invention comprises providing an amorphous Group IVa metal compound on silica support. According to that embodiment the temperature should not be allowed to Tise above 350° C. during the reaction between the metal halide, in particular the metal chloride, and the support, because, e.g., the zirconium chloride species ($ZrCl_3$ and $ZrCl_2$) will start to form crystallites of the formula $ZrO_2$ on the surface of the support at temperatures over about 350° C. The crystallites will impair the activity of the catalysts. At temperatures of about 600° C., the catalysts prepared on silica support become practically inactivated. On alumina supports, higher reaction temperatures can be used.

As mentioned above, the catalysts prepared can contain more than one Group IVa metal compound. One of the compounds is always zirconium or hafnium fluoride, chloride, bromide or iodide, respectively, whereas the second and third compounds may comprise a hafnium, zirconium or titanium halide. Titanium halides can be bound to the support from vaporized titanium halides, such as $TiCl_4$, or from organometal compounds which are composed by reacting them with hydrohalo acids to form the corresponding halides on the support. Of the organic titanium compounds, in particular the alkoxides, such as the isopropoxide and the isobutoxide derivates, should be mentioned.

Of the above-mentioned halogen compounds, $ZrCl_4$ and $HfCl_4$ are typically vaporized at a temperature in the range from 250° to 350° C., in particular 260° C. to 320° C., whereas $TiCl_4$ is vaporized at a temperature above 25° C.

The reagents, $ZrCl_4$, $HfCl_4$ and $TiCl_4$ compete with each other for the same bonding sites. That is the reason why the binding order of the reagents has an effect on the saturation level (cf. below) in addition to the preheat temperature of the support and the chemisorption temperature. If, for instance, $ZrCl_4$ is first processed to silica (calcined at 300° C.) and then $TiCl_4$, in a particular embodiment some 1 wt-% of Ti and 6 wt-% of Zr are bound to the support. However, if the pulsing order is reversed, $ZrCl_4$ removes all Ti from the support and the Zr content becomes as high as 9.3 wt-%. Thus, it appears that $TiCl_4$ creates new binding sites for $ZrCl_4$ (cf. the chemical treatment with $AlCl_3$ described below). The vapour pressure of $HfCl_4$ and $ZrCl_4$ can be regulated to the same level, and these reagents can also be brought to the support simultaneously, although a more precise metal content regulation is achieved by alternate pulsing of the reagents. It is also possible to vaporize two of the reagents simultaneously.

According to a preferred embodiment of the invention, the catalyst preparation comprises the following stages:

1) Pretreatment of the oxidic support, 2) vaporization of the reactant(s) and binding of it (them) to the support surface, 3) flushing with an inert gas and 4) an optional treatment of the catalyst with organic alumino compounds.

According to the invention all reagents for stages 1, 2 and 3 are brought into the reaction chamber in the vapour phase, typically one component at a time.

In the first stage of the process, the support can be subjected to a pretreatment at elevated temperatures prior to the actual binding reaction. The heat treatment of the support can be applied to modify the number and character of the OH groups on the support and, thereby, the amount of metal species bound. The maximum temperature of the preheating process of silica supports is about 450° C. if $ZrCl_4$ is to be bound thereto. Alumina supports can be preheated up to temperatures in the range of 800° to 900° C.

An elevated pretreatment temperature reduces the number of excess OH groups and diminishes side reactions catalyzed by acid sites. The heat pretreatment is carried out for 1 to 40 h, preferably for 2 to 24 hours.

Instead of, or in addition to heating, the support can also be pretreated by contacting it with suitable compounds which will modify its surface in an advantageous way. Thus, the silica support can be treated with alumino compounds. By reacting alumino chloride and water vapour with silica, an $Al_2O_3$ layer can be formed which prevents the formation of $ZrO_2$ crystallites onto the surface of the support. In addition to aluminium chloride organic aluminium compounds can be used. The following examples may be mentioned: TMA (trimethylaluminium), TEA (triethylaluminium), DEALOX (diethylaluminium ethoxide) TEB (triethylboron) TIBA (triisobutylaluminium), EADC (ethylaluminium dichloride) and MAO (methylalumoxane)

In the second stage of the process, vaporized reagent(s) is (are) chemisorbed to the support by contacting the reagent vapours with the support. The vapour pressure of the vaporized GROUP IVa metal compound is kept sufficiently high during the process and the duration of interaction with the support material surface sufficiently long so as to achieve saturation or, preferably supersaturation, with the active material or its precursor, respectively, at the bonding sites of the support material. The partial pressure of the vaporized reagent is typically in the range from about 0.010 to about 95 kPa. Lower pressures will require longer reaction times. It is particularly preferred to use a partial pressure of at least 1 kPa. $ZrCl_4$ and $HfCl_4$ are preferably vaporized at temperatures in the range of 260° to 320° C. which corresponds to partial vapor pressures in the range of about 5 to 50 kPa (for $ZrCl_4$) and 10 to 95 kPa (for $HfCl_4$). $TiCl_4$ is preferably vaporized at temperatures in the range of about 23° C. to 70° C. (corresponding to partial pressures of about 1 to 15 kPa). The proportion of excess active material used in relation to the concentration necessary to achieve complete saturation of all available bonding sites on the suppport material surface (customarily called a monolayer coverage) is typically 1- to 100-fold, preferably 1- to 3-fold. The amount of the GROUP IVa metal compound necessary for a monolayer coverage can be calculated from the area of the support determined with the help of, e.g., the BET method, and from the known molecular structure of the support.

According to a preferred embodiment, the reaction temperature must not fall below the temperature necessary for the evaporation of the reagent; otherwise, condensation of the reagent could occur. Further, the reagent must not be allowed to condense on its way to the reaction chamber. Therefore, its temperature must not be allowed to fall below the reaction temperature. The Group IVa compound and the operating temperature must be selected so as to avoid the decomposition of the metal compound or a possible condensation of its decomposition products.

Using experimental methods it is possible to determine a temperature range, or temperature span, in which the reaction is most advantageously carried out. As explained above, if silica is used as support, the second stage of the process is preferably carried out at a temperature in the range from about 250° to about 350° C., in particular about 260° to about 320° C. The lower limit of the given temperature span is determined by the condensation temperature of the Group IVa compound to be evaporated at the employed partial vacuum and by the activation energy necessary for establishing a desired surface bond. The upper limit is determined by the temperature at which the transition metal compound chemisorbed on the support will start to form crystallites, which are catalytically less active.

The reaction between the catalytically active material or its compound and the support can be carried out at ambient pressure, or alternatively, at overpressure. Preferably, the reaction is, however, carried out in a partial vacuum. Typically, the operating pressure of the process lies in the range from about 0.1 to about 1000 mbar (0.01 kPa to 100 kPa), preferably in the range from about 1 to about 100 mbar (0.1 kPa to 10 kPa). Also pre- and posttreatment steps, if any, are preferably carried out in partial vacuum. A benefit gained from the use of a partial vacuum is that the reaction space is kept cleaner and the diffusion rate is increased. The reaction time is not particularly critical as long as it is sufficient to allow the evaporated reagent to interact with all available binding sites of the support. Thus, in laboratory conditions the reaction time can be selected, for instance, in the range from about 1 min to 25 hours. Even shorter or longer periods of time are possible, depending on the intensity of the reaction between the reagent and the support and on the amount of the support. Conventionally a reaction time of some minutes up to 10 hours is sufficient for processing a 5 to 20 g amount of the support material.

The vaporized transition compound can be introduced into the reaction space as such, or alternatively, using an inert carrier gas such as nitrogen or a noble gas. Preferably, a protective gas atmosphere formed by an inert gas is used, the same inert gas being used as the carrier gas for the transition metal vapour.

Any unreacted transition metal reagent and the side products of the reaction between the metal and the support (HCl and organic residues of the reagent, for instance) are removed from the reaction space in the vapour phase and preferably at the reaction temperature (to avoid potential condensation problems). The chemisorption reaction is therefore followed by a nitrogen purge at the reaction temperature to remove unreacted reagent and released HCl.

After the binding of the transition metal catalytically active species to the support and prior to being used for polymerization, the catalyst can be modified, i.e. preactivated, by adding conventional organometal compounds, in particular Al-alkyl compounds typically used as cocatalysts. Suitable organometal compounds are, for example, TMA (trimethylaluminium), TEA (triethylaluminium), DEALOX (diethylaluminium ethoxide), TEB (triethylboron) TIBA (triisobutylaluminium), EADC (ethylaluminium dichloride) and MAO (methylalumoxane), to mention a few. TMA, TEA, TIBA and DEALOX are considered to be particularly advantageous for the purpose of the present invention.

The reaction between the support containing the catalytically active transition metal species and the organometal compound is carried out by suspending the support in a solvent containing the suitable cocatalyst compound.

The cocatalyst may of course also be added to the polymerization reactor, as known per se. In that case, the catalysts are transferred in nitrogen atmosphere from the reaction chamber for cocatalyst addition and polymerization. If, however, the catalysts are preactivated as described above, no cocatalyst addition is needed during polymerization.

The polymerization is carried out according to known processes. Preferably, it is conducted at increased pressure in slurry or in vapor phase. The pressure depends on the process used. Typically, it varies from about 1.5 bar to 1000 bar (150 kPa to 100,000 kPa), preferably it is at least 5 bar (500 kPa). Thus, the pressure advantageously lies in the range from about 5 to 100 bar (500 kPa to 10,000 kPa), and in particular it is between about 10 and 75 bar (1,000 kPa–7,500 kPa). The operational pressures of slurry processes are somewhat higher than those used in gas phase polymerization processes. The polymerization temperature is from about 20° to about 300° C., preferably from about 50° to 275° C. The partial hydrogen pressure is in the range from about 0.1 bar (10 kPa) to about 20 bar (2,000 kPa), preferably from about 0.5 bar (50 kPa) to about 10 bar (1,000 kPa).

The present invention provides significant benefits. The catalysts are readily prepared with the process according to the present invention. Since no solvents are used in the reaction of the transition metal and the support, no separate evaporation stage is needed, and the activity of the heterogeneous catalysts prepared is high. The catalyst systems are very well suited to polymerization of ethylene or copolymerization of ethylene with other alpha-olefins, such as propylene, butylene, 4-methyl-1-pentene and hexene. They can be used in the gas phase or in slurry polymerization. Surprisingly, it has been found that the polymerization process employing the novel catalyst will provide products of the Ultra High Molecular Weight -type (UHMWPE) having very broad MWD and often having a bimodal molecular weight distribution. The molecular weight of the HDPE produced is often over 350,000 at a hydrogen-to-ethylene partial pressure ratio of less than 0.20. $MFR_{21.6}$ is 0.01 to 5, typically less than 1. The broad molecular weight distribution improves the mechanical properties of the polymers prepared, which can be used, in particular, as high-strength films and sheets. By treating the catalyst prepared in the gas phase with aluminium alkyl compounds, the activity of the catalyst may be improved significantly.

Below, the invention will be examined in more detail with the aid of the following working examples.

EXPERIMENTAL

A. Catalyst preparation

The processing equipment consists of a reaction chamber for 1–20 g of catalyst. $ZrCl_4$ and $HfCl_4$ were vapourized at 260°–320° C., $TiCl_4$ at 25° C. Chemisorption temperature was 150°–550° C. for $TiCl_4$ and 270°–550° C. for $ZrCl_4$ and $HfCl_4$. The selected metal halide was brought in nitrogen flow through heated lines to the reaction chamber and was reacted with the support (5–10 g) in nitrogen flow at a pressure of 50–1000 mbar for 1 to 3 hours. A purge with nitrogen for 1 to 3 hours was made after the reaction.

The number of bonding sites of the preheated (300°–900° C.) support can be determined by H-NMR, if necessary. The chloride compounds used react with isolated OH groups according to diffuse reflectance Fourier infra-red spectrometry (FTIR) measurement. The amount of reagent needed can thus be calculated, when the number of bonding sites is known. An overdose (1 to 2 times the number of the bonding sites) is vapourized. The saturation level of the metal concerned is not effected by the overdosing. The saturation level of the samples was monitored by determining the metal concentrations of samples taken from the upper part and the bottom of the solid support bed. Zr was determined by X-ray fluorescence spectrometry (XRF) or by instrumental neutron activation analysis (INAA). Hf and Ti were determined by INAA. UV-VIS spectrophotometry was used for Ti determinations. Chloride was determined in the samples by potentiometric titration. X-ray diffraction (XRD) was used to determine if crystallization of ZrCl species to $ZrO_2$ took place. Diffuse reflectance FTIR was used to analyze the bonding sites of $ZrCl_4$ on silica.

B. Polymerization conditions

Polymerizations were carried out in isobutane slurry, 1800 ml of 1-butane being added to a 3–1 reactor. A catalyst and a cocatalyst were fed to the reactor under nitrogen pressure. Polymerization temperatures were 95° C. and 105° C., and total pressures 3,100 and 4,100 kPa, respectively. Hydrogen was charged from a 500 ml bomb (pressure 5 bar) to the reactor at the beginning of the polymerization with ethylene flow. The reaction mixture was agitated first at 500 rpm, and after 10 minutes, the agitation speed was raised to 600 rpm, after a further 20 minutes, this was raised to 700 rpm.

C. Cocatalyst addition

The influence of the amount of cocatalyst on the catalyst activity and melt flow rates of polymer solutions was studied by feeding various amounts of the cocatalyst to the reactor. The cocatalysts used comprised a 10 wt-% solution of triethylaluminium (TEA) in heptane (supplied by Schering) and methylalumoxane (MAO) in toluene (7.32 wt-% Al, $\rho$=0.863 g/cm$^3$) (supplied by Texas Alkyl, Inc.). The ZrCl$_4$/SiO$_2$ system was not active without cocatalyst.

D. Catalyst modification with Al-alkyl-compounds

In some experiments an Al-alkyl compound was added straight to the catalyst and not to the reactor as normally. These modifications were done in inert atmosphere as follows: the catalyst was mixed with anhydrous pentane to obtain a slurry. An Al-alkyl solution was injected to the slurry and a colour change to yellow could immediately be observed. Mixing was continued for 2 hours at room temperature and after that the pentane was evaporated using standard Schlenk technique. Polymerization was carried out without cocatalysts.

EXAMPLE 1

Preparation of ZrCl$_4$ and HfCl$_4$ Catalysts

Under the experimental conditions described under section A above, a number of Group IVa catalysts were prepared. Tables 1A to 1D indicate the results of the preparation processes.

TABLE 1A

ZrCl$_4$ catalysts on silica or aluminium

| Sample | Support and pre-treatment T/°C. | Zr wt-% |
|---|---|---|
| 1 | silica/300 | 6.8 |
| 2 | silica/300 | 6.6 |
| 3 | alumina/300 | 11 |
| 4 | alumina/450 | 6.5 |
| 5 | alumina/800 | 3.6 |
| 6 | silica/300 | 6.9 |
| 7 | silica/300 | 5.9, Hf 2.0 wt-% |
| 8 | silica/450 | 5.2 |
| 9 | silica/300 | —, Ti 3.8 wt-% |

TABLE 1B

ZrCl$_4$ catalysts on silica and further containing Ti

| Sample | Support and pre-treatment T/°C. | Reagent + reaction-T/°C. | Zr p-% | Ti p-% |
|---|---|---|---|---|
| 10 | silica 300 | ZrCl$_4$ 300<br>TiCl$_4$ 250 | 5.9 | 1.0 |
| 11 | silica 300 | TiCl$_4$ 250<br>ZrCl$_4$ 300 | 9.3 | <0.1 |
| 12 | silica 300 | ZrCl$_4$ 300<br>Ti-i-pro 210<br>HCl 210 | 7.7 | 0.3 |
| 13 | silica 300 | Ti-i-pro 210<br>HCl 210<br>ZrCl$_4$ 300 | 7.3 | 3.3 |
| 14 | silica 300 | ZrCl$_4$ 300<br>Ti-i-pro 200<br>HCl 200 → 300<br>ZrCl$_4$ 300 | 11 | 2.4 |
| 15 | silica 300 | Ti-i-pro 200<br>HCl 200 → 300<br>ZrCl$_4$<br>2 cycles, with intermittent N$_2$ treatment at 600° C. | 10 | 1.4 |

Ti-i-pro = titanium-isopropoxide

TABLE 1C

Binding of HfCl$_4$ and ZrCl$_4$ on silica preheated at 300° C. Concentrations in percent by weight

| Sample | Preheating T °C./h | Reaction T °C./h | Concentration wt-% | | |
|---|---|---|---|---|---|
| | | | Hf | Zr | Cl |
| 16 | 300/16 + 3 | Hf300/2 | 8.9 | — | 5.9 |
| 17 | 300/16 + 3 | Hf + Zr 300/2 | 3.2<br>3.8 | 5.0<br>4.8 | 6.1<br>6.3 |
| 18 | 300/16 + 3 | Hf/Zr 300/<br>(5 + 5) × 12 | 1.4<br>1.6 | 6.8<br>6.2 | 6.3<br>6.2 |
| 19 | 300/16 + 3 | Zr/Hf 300/<br>(5 + 5) × 12 | 2.1<br>2.6 | 6.0<br>5.9 | 6.4<br>6.3 |
| 20 | 300/16 + 3 | Hf + Zr 300/2 | 1.9<br>2.1 | 6.1<br>5.7 | 6.2<br>6.3 |

TABLE 1D

Binding of HfCl$_4$ and ZrCl$_4$ on silica preheated at 300° C. Concentrations in mmol/g

| Sample | Preheating T °C./h | Reaction T °C./h | Concentration (mmol/g) | | | |
|---|---|---|---|---|---|---|
| | | | Hf | Zr | Cl | Hf + Zr |
| 16 | 300/16 + 3 | Hf300/2 | 0.50 | — | 1.7 | |
| 17 | 300/16 + 3 | Hf + Zr 300/2 | 0.18<br>0.21 | 0.55<br>0.53 | 1.7<br>1.8 | 0.73<br>0.74 |
| 18 | 300/16 + 3 | Hf/Zr 300/<br>(5 + 5) × 12 | 0.08<br>0.09 | 0.75<br>0.68 | 1.8<br>1.7 | 0.83<br>0.78 |
| 19 | 300/16 + 3 | Zr/Hf 300/<br>(5 + 5) × 12 | 0.12<br>0.15 | 0.66<br>0.65 | 1.8<br>1.8 | 0.78<br>0.80 |
| 20 | 300/16 + 3 | Hf + Zr 300/2 | 0.11<br>0.12 | 0.67<br>0.62 | 1.7<br>1.8 | 0.78<br>0.74 |

Figure 5A:
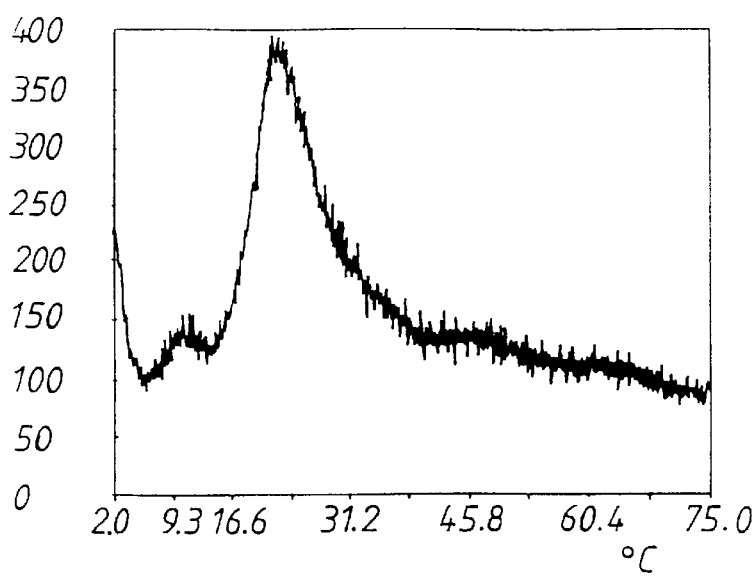
FIG. 5 shows the XRD patterns for $ZrCl_4$/silica catalysts treated at different temperatures.
Figure 5B:
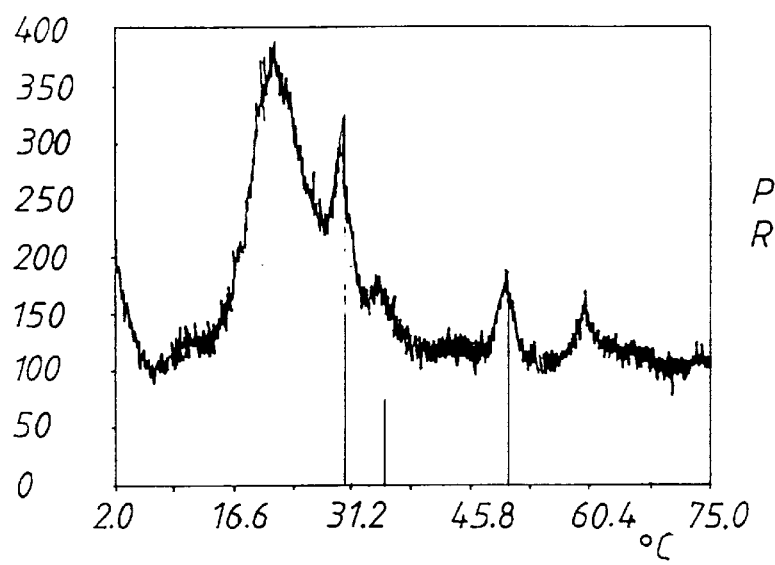
Figure 5C:
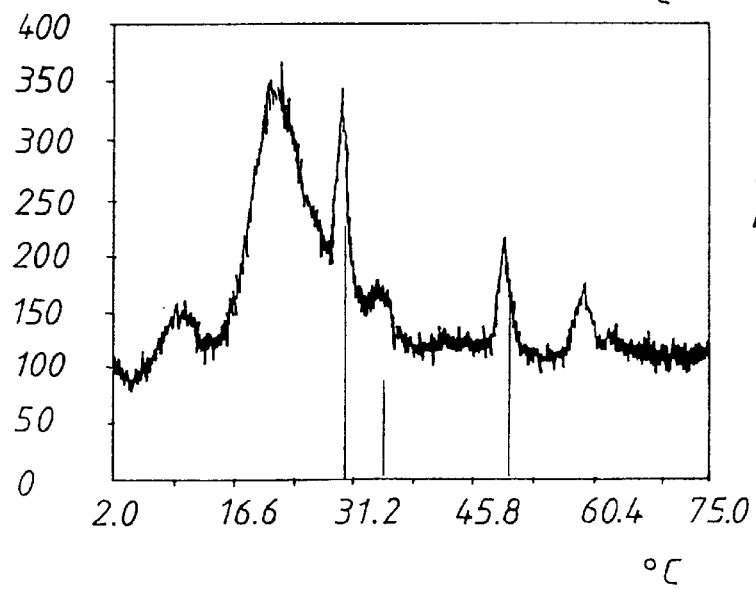

ZrO$_2$ was formed according to XRD measurements (cf. FIG. 5), when ZrCl$_4$ reacted with silica preheated at higher than 450° C. or at reaction temperatures at or over 450° C. Amorphous ZrCl$_x$ (x is 2 or 3) leads to better polymerization activity than crystalline ZrO$_2$ species.

From these tests, it appeared that the reagent ZrCl$_4$ contained a small amount of HfCl$_4$ as an impurity. The Hf:Zr ratio of the catalysts prepared remained constant (0.01) and was not dependent on the reaction conditions used. This is probably due to the similar vapour pressure of these two compounds.

The surface saturation level of Hf+Zr on silica preheated at 300° C. was 0.77+/−0.03 mmol/g (Table 1D).

Figure 2:
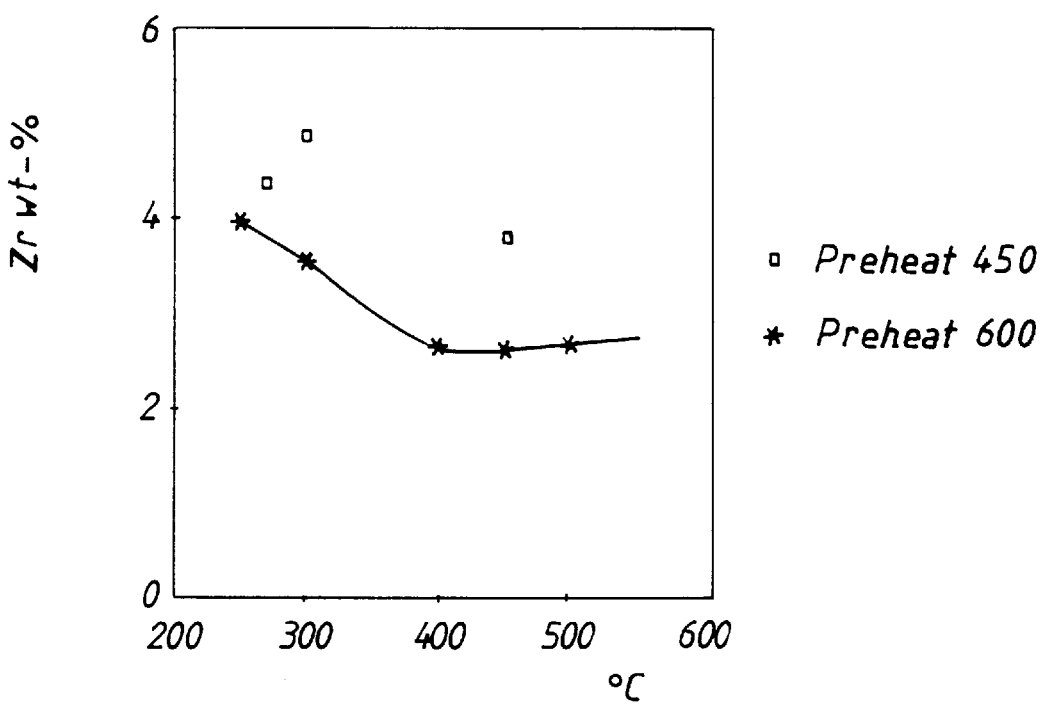

FIGS. 1 and 2 show the binding or ZrCl$_4$ as a function of the preheating temperature of the support. It can be noted that the concentration of Zr can be regulated either by preheating the support or by varying the reaction temperature.

EXAMPLE 2

Ti with ZrCl$_4$

The ZrCl$_4$/SiO$_2$ catalysts were treated with titanium compounds in order to modify the catalytic activity thereof, in particular to increase the amount of short-chained polymers.

Two different Ti reagents were used when processing Ti-Zr/silica catalysts: TiCl$_4$ and Ti-isopropoxide. TiCl$_4$ was vaporized at 25° C. and Ti-isopropoxide at 120° C. Silica was preheated at 300° C. in all samples. Tables 2A and 2B show the saturation levels of Zr and Ti in samples processed in different ways. HCl gas was used to remove the ligand in Ti-isopropoxide. Both Ti reagents can be used together with ZrCl$_4$, but lower Ti saturation levels were measured when TiCl$_4$ was used instead of Ti-isopropoxide.

I. TiCl$_4$

ZrCl$_4$ is capable of removing TiCl$_{(x)}$ on silica almost totally. ZrCl$_4$ must be bound to silica first and TiCl$_4$ after that at 300° C. in order to get Ti bound from TiCl$_4$. The saturation level of Ti is 1.3 wt-% and part of Zr is released from the surface.

ZrCl$_4$ removes totally or partly both Ti and Hf bound from chlorides.

The metal concentration of the catalysts can be regulated by varying the preheating temperature of the support and the reaction temperature.

TABLE 2A

Binding of Ti and Zr on SiO$_2$ from TiCl$_4$ and ZrCl$_4$

| Sample | Pretreatment T °C./h | Reaction T °C./h | Concentration (p-%) | | |
|---|---|---|---|---|---|
| | | | Zr | Ti | Cl |
| 21 | 300/16 + 3 | Ti 175/2 | — | 3.8 | 6.9 |
| 22 | 300/16 + 3 | Ti 300/2 | — | 3.2 | 4.7 |
| 23 | 300/16 + 3 | Zr 300/2 | 6.9 | 0.1 | 7.4 |
| | | Ti 175/2 | 7.3 | <0.05 | 7.4 |
| 24 | 300/16 + 3 | Ti 175/2 | 8.9 | <0.05 | 7.0 |
| | | Zr 300/2 | 7.2 | <0.05 | 7.0 |
| 25 | 300/16 + 3 | Zr 300/2 | 3.5 | 1.5 | 5.4 |
| | | Ti 300/2 | 4.3 | 1.1 | 5.8 |
| 26 | 300/16 + 3 | Ti 175/2 | 6.8 | 0.06 | 6.4 |
| | | Zr 300/2 | 8.1 | 0.04 | 6.6 |
| 27 | 300/16 + 3 | Ti 175/2 | 7.4 | <0.05 | 6.9 |
| | | Ti 175 ⎯→ 300/1.5 | | | |
| | | Zr 300/2 | | | |
| 28 | 300/16 + 3 | Ti + Zr 00/2 | 5.1 | 0.7 | 6.1 |
| | | | 5.3 | 0.6 | 6.5 |
| 29 | 300/16 + 3 | Ti 300/2 | 6.0 | 0.09 | 6.3 |
| | | Zr 300/2 | 6.1 | 0.07 | 6.6 |

Figure 4:
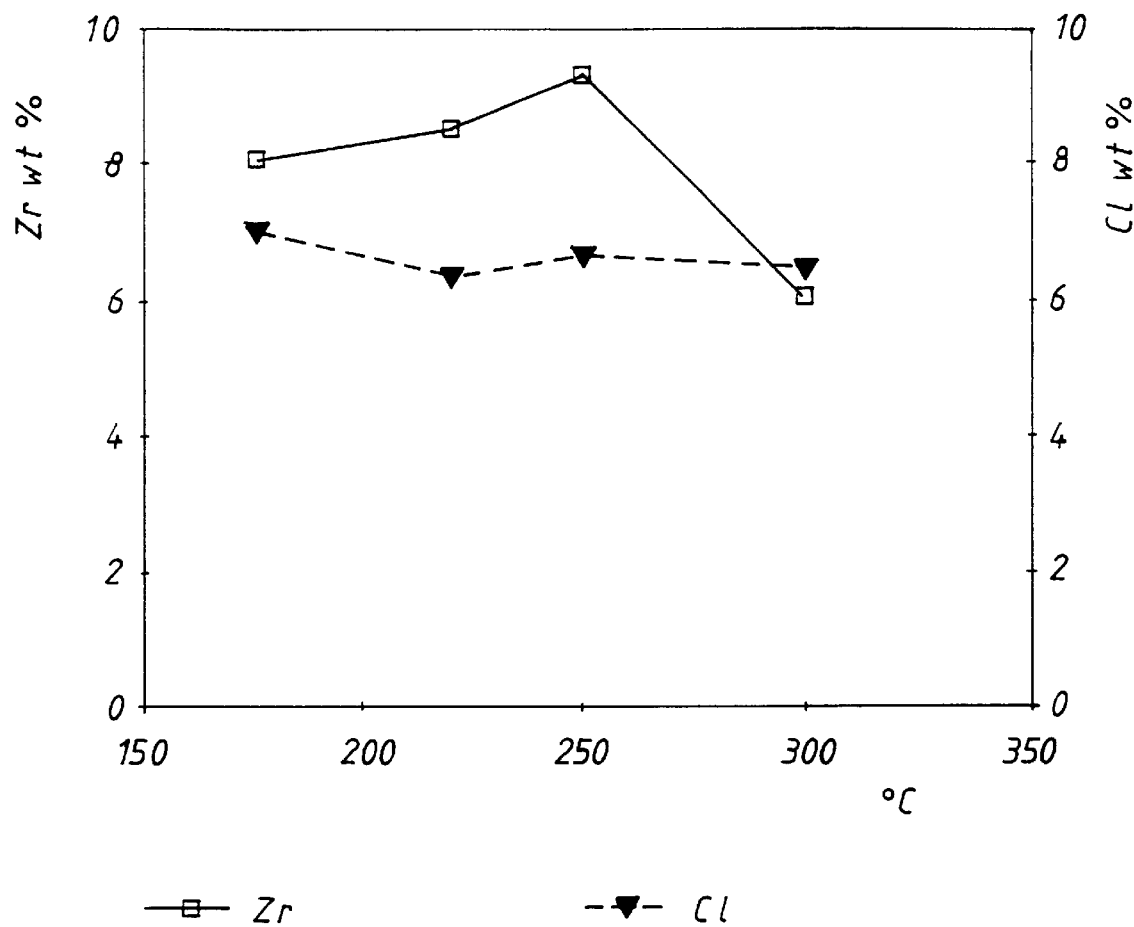

It appears from the results that the TiCl$_4$ treatment of the silica surface obviously opens part of the hydrogen bonded OH groups, thus providing increased amounts of bonding sites to ZrCl$_4$ as compared with plain silica. FIG. 4 presents the change in Zr concentration when preheated at 300° C. is pretreated with TiCl$_4$ at 175°–300° C.

II. Ti-isopropoxide

The saturation level of Ti on silica preheated at 300° C. was 3.3 wt-%. HCl can be used to remove the organic part bound to Ti. Ti itself was not released with HCl pulsing at 210°–300° C. Neither was Ti released when ZrCl$_4$ was bound after HCl treatment. Isolated OH groups and part of the hydrogen-bonded OH groups serve as bonding sites to propoxide. ZrCl$_4$ pulsed straight after Ti-isopropoxide binding without HCl treatment between the pulses removes part of the Ti from the surface.

TABLE 2B

Binding of Ti and Zr on SiO$_2$ from Ti-isopropoxide and ZrCl$_4$.

| Sample | Pretreatment T °C./h | Reaction T °C./h | Concentration (wt-%) | | | |
|---|---|---|---|---|---|---|
| | | | Zr | Ti | Cl | C |
| 30 | 300/16 + 3 | Zr 300/2 Ti-i 210/2 | 5.9 | 0.6 | 1.9 | <0.1 |
| 31 | 300/16 + 3 | Zr 300/2 Ti-i 210/2 HCl 210/2 | 7.7 | 0.3 | 3.8 | <0.1 |
| 32 | 300/16 + 3 | Ti-i 210/2 HCl ⎯→ | 7.3 | 3.3 | 6.4 | <0.1 |

TABLE 2B-continued

Binding of Ti and Zr on SiO$_2$ from Ti-isopropoxide and ZrCl$_4$.

| Sample | Pretreatment T °C./h | Reaction T °C./h | Concentration (wt-%) | | | |
|---|---|---|---|---|---|---|
| | | | Zr | Ti | Cl | C |
| 33 | 300/16 + 3 | 300/1.5 Zr, 300/2 Ti-i 210/2 | 7.7 | 1.7 | 5.8 | <0.1 |
| | | Zr 300/2 | 7.8 | 0.6 | 6.0 | <0.1 |
| 34 | 300/16 + 3 | Ti-i 210/2 | — | 3.5 | 2.9 | 0.2 |
| | | HCl 210 ⎯→ 300/1 | — | 3.3 | 2.9 | 0.2 |
| 35 | 300/16 + 3 | Ti-i 200/2 | 10.3 | 0.76 | 7.4 | <0.1 |
| | | Zr 200 ⎯→ 300 | 9.3 | 0.73 | 7.9 | <0.1 |

EXAMPLE 3

Polymerization of Ethylene

Polymerizations were carried out under the conditions described in section B above. The results are indicated in Table 3.

TABLE 3

Polymerization of ethylene with ZrCl$_x$/silica or alumina catalysts at 95° C. and 31 bar

| Sample No. | 1 | 2 | 3 | 4 | 5 |
|---|---|---|---|---|---|
| Support pretreatment °C. | 300 | 300 | 300 | 450 | 800 |
| Zr load/wt-% | 6.8 | 6.6 | 10.9 | 6.5 | 3.6 |
| Run time/min. | 60 | 60 | 60 | 60 | 60 |
| Catalyst amount/mg | 166 | 158 | 179 | 170 | 171 |
| Cocatalyst/ml | 2 | 2 | 2 | 2 | 2 |
| Al/Zr ratio | 10 | 11 | 6 | 10 | 18 |
| H$_2$ (bar)/500 ml | 5 | 5 | 5 | 5 | 5 |
| Yield/g PE | 101 | 52 | 86 | 64 | 49 |
| Activity | | | | | |
| g PE/g cat h | 608 | 329 | 536 | 376 | 287 |
| g PE/g Zr h | 8,948 | 4,987 | 4,917 | 5,837 | 8,072 |
| BD g/cm$^3$ | 0.45 | 0.44 | 0.26 | 0.26 | 0.26 |
| MFR$_{21.6}$ | 0.1 | 0.3 | 0.0 | 0.0 | 0.0 |

Figure 3:
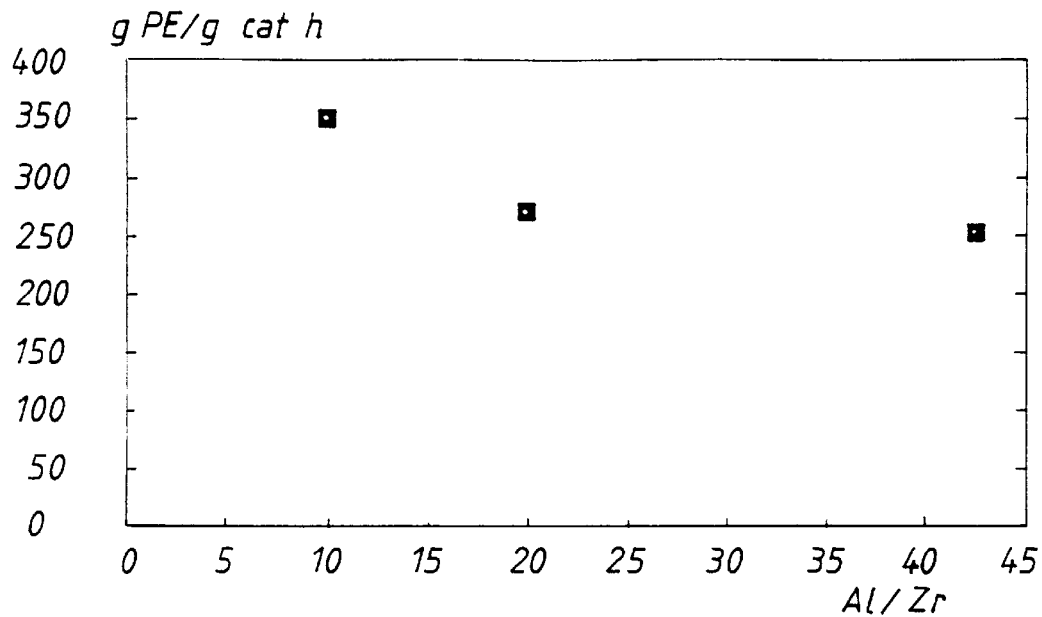
FIG. 3 shows the activity of the catalysts as a function of the Al/Zr molar ratio, FIG. 4 indicates the change in Zr concentration when silica preheated at 300° C. is pretreated with $TiCl_4$ at 175°–300° C.
Figure 6:
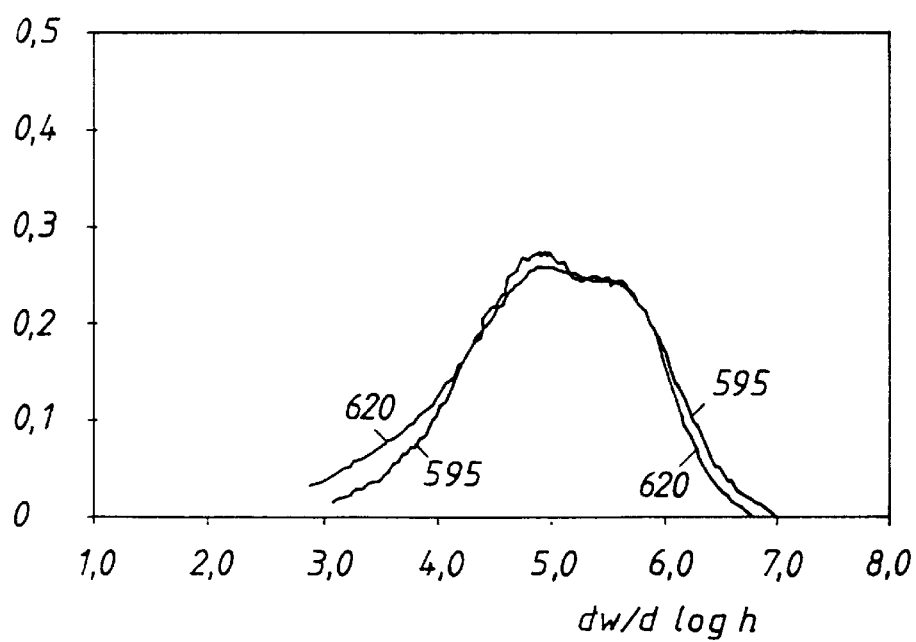
FIG. 6 shows the molecular weight distributions of PE produced by ZrCl4 on silica with two different hydrogen/ethylene ratios.

When a cocatalyst was fed to the polymerization, maximum activities were obtained at low Al/Zr ratios. FIG. 3 shows the activity as a function of the Al/Zr molar ratio. The cocatalyst did not change the polymer MFR$_{21.6}$ values. The influence of hydrogen to catalyst activity was also evaluated. It appeared that the MFR$_{21.6}$ values of the produced polymers grew as the ratio H$_2$/C$_2$H$_4$ increases. The weight average molecular weight (M$_w$) decreased from 416,000 to 315,000 as the ratio was raised. Hydrogen broadened the molecular weight distribution, and the polydispersity increased from 15 to 21. A bimodal distribution was also observed, as indicated by FIG. 6.

Two ZrCl$_4$/silica catalysts, whose supports had been pretreated at 600° or 750° C. and having Zr concentrations of 3.4 and 2.0 wt-%, respectively, were also tested for catalytic activity. It appeared that they were not at all active in the polymerization of ethylene.

EXAMPLE 4

Catalyst Modification with Al-alkyl-compounds

Table 4 presents the polymerization results using three different Al-alkyls for modifying the activity of catalyst No. 2 of Example 1. Using TEA as a modifier, the activity increased remarkably from 330 to 750 g PE/g cat h compared to the normal run with cocatalyst. When trimethylaluminium (TMA) was used as a modifier, activity was further increased to 1,230 g PE/g cat h. Also, $MFR_{21.6}$ increased a little. Diethylaluminium methoxide (DEALOX) changed $MFR_{21.6}$ values considerably, but not the catalyst activity. The ethoxide group could have some kind of different effect on the termination process.

TABLE 4

Modification of catalyst with Al-alkyl-compounds

| Sample No. | 2 | 2 | 2 | 2 |
|---|---|---|---|---|
| Run time/min | 60 | 60 | 60 | 60 |
| Catalyst amount/mg | 158 | 150 | 158 | 165 |
| Cocatalyst/ml | 2 | — | — | — |
| Al/Zr ratio | 11 | 2.6 | 2.4 | 2.6 |
|  |  | DEALOX | TEA | TMA |
| $H_2$(bar)/500 ml | 5 | 5 | 5 | 5 |
| Yeild/g PE | 52 | 51 | 118 | 203 |
| Activity |  |  |  |  |
| g PE/g cat h | 329 | 340 | 747 | 1,230 |
| g PE/g Zr h | 4,987 | 5,152 | 11,318 | 18,636 |
| BD g/cm³ | 0.44 | 0.42 | 0.31 | 0.40 |
| $MFR_{21.6}$ | 0.3 | 2.6 | 0.5 | 0.9 |

EXAMPLE 5

Catalyst Modification with Al-alkyl-compounds

Further preactivation tests with aluminium alkyl compounds were carried out for Ti-modified catalysts. The polymerization results are indicated in Table 5.

EXAMPLE 6

Copolymerization and Polymer Properties

Copolymerization of ethylene with 1-hexene was carried out using TMA preactivated $ZrCl_x/SiO_2$ catalysts. The comonomer was added as a batch to the hot reactor simultaneously with the ethylene and hydrogen. The polymerization conditions and results, including the effect of polymerization temperature and comonomer on melting point, crystallinity and crystallization temperature are indicated in Table 6.

The comonomer incorporation was about 1 wt-%, according to NMR results. 1-hexene did not affect the activity in cocatalyst run, but its effect on $M_w$ was clear. The comonomer lowered the melting point from 133.3° C. to 130.1° C.; crystallinity and crystallization temperature were lower with comonomer.

TABLE 5

Polymerization results of Zr, Ti/SiO₂-catalysts. Silica pretreated at 300° C. Run conditions: T = 95° C., $p_{tot.}$ = 3100 kPa, $H_2$ 500 kPa/500 cm³ and medium isobutane 1.8 cm⁸ (Zr = $ZrCl_4$, Ti = $TiCl_4$, Ti-i = Ti(i-OPr)$_4$

| Sample | 6 | 6 | 8 | 12 | 13 | 10 | 10 | 14 | 14 | 15 |
|---|---|---|---|---|---|---|---|---|---|---|
| Preparation | Zr300 | Zr300 | Ti175 | Zr300 | Ti-i210 | Zr300 | Zr300 | Ti250 | Zr300 | Ti-i200 |
|  |  |  |  | Ti-i210 | HCl210 | Ti250 | Ti250 | Zr300 | Ti-i200 | HCl |
|  |  |  |  | HCl210 | Zr300 |  |  |  | HCl | Zr300 |
|  |  |  |  |  |  |  |  |  | Zr300 | N₂600 |
|  |  |  |  |  |  |  |  |  |  | Ti-i200 |
|  |  |  |  |  |  |  |  |  |  | HCl |
|  |  |  |  |  |  |  |  |  |  | Zr300 |
| Analysis, |  |  |  |  |  |  |  |  |  |  |
| Zr wt-% | 6.9 | 6.9 | — | 7.7 | 7.3 | 5.9 | 5.9 | 9.3 | 10.9 | 10.0 |
| Ti wt-% | — | — | 3.8 | 0.3 | 3.3 | 1.0 | 1.0 | <0.1 | 2.4 | 1.4 |
| Cl wt-% | — | — | 6.9 | 3.8 | 6.4 | 6.3 | 6,3 | 6.7 | 6.1 | 4.0 |
| C wt-% | — | — | — | <0.1 | <0.1 | — | — | — | <0.1 | <0.1 |
| Cocatalyst | TEA | — | TEA | TEA | TEA | TEA | — | TEA | — | TEA |
| Preactivation | — | TMA | — | — | — | — | TMA | — | TMA | — |
| Al/M | 10 | 2.5 | 57 | 8 | 12 | 13 | 4.1 | 11 | 3.1 | 4.5 |
| Activity gpPE/gcat/h | 290 | 900 | 60 | 70 | 210 | 140 | 580 | 230 | 860 | 160 |
| $MRF_{21.6}$ | 0.3 | 0.9 | 5.0 | 0.1 | 0.3 | 0.3 | 0.3 | 0.4 | 1.2 | 0.6 |

TABLE 6

Copolymerizations with 1-hexene using Zr/SiO$_2$ (sample 6)-catalysts. Polymerization conditions:
T = 95° C. and 3100 kPA. Al/Zr = 10 during cocatalyst runs and 2.5 during preactivation.

| Cocatalyst runs (TEA) | Comon. ml | Activity kgPE/gcat/h | Hexene in pol. wt-% | M$_w$ *10$^6$ | SCE | UCE | T$_m$ °C. | Cryst. % | T$_{cr}$ °C. |
|---|---|---|---|---|---|---|---|---|---|
| A | — | 0.29 | — | 1.6 | — | — | — | — | — |
| B | 50 | 0.29 | 0.2 | 1.4 | 1.4 | 0.5 | — | — | — |
| Preactivated catalysts (TMA) | | | | | | | | | |
| C | — | 0.90 | — | 1.2 | 3.1 | 1.8 | 133.3 | 72.9 | 117,7 |
| D | 50 | 0.77 | 0.8 | 0.8 | 4.2 | 3.7 | 130.1 | 67.1 | 115,1 |
| E$^{a)}$ | — | 1.62 | — | 0.9 | 2.1 | 1.7 | 133.4 | 68.8 | 116,7 |

$^{a)}$Temperature 105° C. and pressure 3500 kPa. SCE = saturated chain ends/1000 C (NMR),
UCE = unsaturated chain ends/1000 C (NMR),
T$_m$ = polymer melting point (DSC),
T$_{cr}$ = polymer crystallization temperature (DSC),
Cryst. = crystallinity (DSC).

EXAMPLE 7

Modification of the Support with an Organic Aluminium Compound

Zr-catalyst were prepared by vaporizing ZrCl$_4$ at 270° C. and TMA at room temperature and binding the compounds from vapor phase to a silica support (Grace 955). The following tables indicate the reaction conditions, including the order of introduction of the reagents, and the elemental concentrations of the catalysts (Table 7) as well as the results of polymerization of ethylene (Table 8).

TABLE 7

Preparation of catalysts

| Sample | Preheat (°C./h) | Reaction (°C./h) | Zr (wt-%) | Al (wt-%) | Cl (wt-%) | C (wt-%) |
|---|---|---|---|---|---|---|
| 35 | 300/16 + 3 | ZrCl$_4$ 300/2 | 7.1 | — | 7.0 | — |
| 36 | 600/16 + 450/3 | TMA 80/4 ZrCl$_4$ 300/2 | 4.7 | 2.7 | 6.2 | nd |
| 37 | 300/16 + 3 | ZrCl$_4$ 300/2 TMA 80/4 | 6.8 | 1.8 | 5.9 | 1.4 |
| 38 | 300/16 + 3 | TMA 80/4 ZrCl$_4$ 300/2 | 5.0 | 3.4 | 6.7 | 0.9 |

TABLE 8

Polymerization results

| Sample | Al:Zr | T polym. °C. | H$_2$ ml/bar | Activity kg PE/g/h |
|---|---|---|---|---|
| 35 | 60* | 95 | — | 0.32 |
| 36 | 0.9 | 70 | 80 | 0.16 |
| 37 | 0.9 | 95 | — | 0.40 |
| 38 | 2.3 | 95 | — | — |

*cocatalyst added (1.5 ml 30% MAO), other samples did not contain cocatalyst

What is claimed is:

1. A process for preparing a heterogeneous catalyst for polymerization of olefins, said catalyst comprising at least one halide of a group IVa metal on a solid inorganic oxidic support, wherein the halide of the group Iva metal is represented by the formula MY$_n$ where M is Zr or Hf and Y is halogen and n is 2 or 3, which process comprises:

a) vaporizing at least one solid halide of a group IVa metal, said halide being selected from the group consisting of zirconium chloride, zirconium bromide, hafnium chloride, and hafnium bromide;

b) introducing the vapor of said halide into a reaction chamber, wherein said vapor is reacted with said oxidic support at from about 260° C. to about 320° C. in order to bind said halide to said support;

c) removing any metal halide not bound to said support as well as any volatile reaction products emanating from the reaction between said metal halide and said oxidic support from said reaction chamber in the vapor phase; and d) optionally treating the product obtained from reacting said metal halide and said oxidic support with an organic aluminum compound to increase the catalytic activity of said catalyst.

2. The process according to claim 1, wherein steps a) to c) are repeated at least once using a halide of another group IVa metal.

3. The process according to claim 1, wherein said product obtained from the reaction between said metal halide and said support is treated with a titanium compound in order to modify the catalytic properties of said catalyst.

4. The process according to claim 1, wherein said zirconium chloride is ZrCl$_4$.

5. The process according to claim 1, wherein said hafnium chloride is HfCl$_4$.

6. The process according to claim 1, wherein the vapor pressure of said halide of the group IVa metal is maintained sufficiently high and the duration of the reaction with said oxidic support is sufficiently long so as to provide at least an equal amount of said metal halide with respect to the number of available bonding sites of said support.

7. The process according to claim 1, wherein, prior to step a), the surface of said support is modified by reacting said support with an aluminum compound.

8. The process according to claim 1, wherein, subsequent to step c), said catalyst is preactivated with a compound selected from the group consisting of TMA, TEA, TIBA, DEA, MAO, and DEALOX in order to increase its activity.

9. The process according to claim 8, wherein the preactivating is carried out in a liquid phase.

10. The process according to claim 1, wherein said reaction chamber is purged with nitrogen in step c).

11. A heterogeneous catalyst for polymerization of one or more olefins, optionally in the presence of a cocatalyst, said heterogeneous catalyst comprising:

(i) at least one amorphous halide of a group IVa metal of the formula ZrY$_x$, wherein Y is halogen and X is 2 or 3;

(ii) a solid oxidic support comprising a compound selected from the group consisting of silica and alumina;

(iii) said amorphous halide having been deposited on said support by vapor phase deposition of said halide;

(iv) an aluminum alkyl compound selected from the group consisting of TMA, TEA, TIBA, DEA, MAO, and DEALOX; and whereby said catalyst is capable of catalyzing the homo- or copolymerization of ethylene at a pressure of at least 500 kPa, thus producing polymers or copolymers of ethylene having a broad molecular weight distribution.

12. The heterogeneous catalyst according to claim 11, further comprising at least one titanium compound.

13. The catalyst according to claims 11 or 12, wherein the group IVa metal halide is $HfY_n$ where Y is chlorine and n is 2 or 3.

14. A heterogeneous catalyst for polymerization of one or more olefins, optionally in the presence of a cocatalyst, comprising at least one group IVa metal halide on a solid oxidic support comprising silica, wherein said group IVa metal halide is an amorphous compound of the formula $ZrY_n$ wherein Y is chlorine and n is 2 or 3, said catalyst being formed by vapor phase deposition of said halide of formula $ZrY_n$ on said silica and wherein said catalyst is capable of catalyzing homo- or copolymerization of ethylene at a pressure of at least 500 kPa, producing a polymer or copolymer of ethylene having a broad molecular weight distribution.

15. A process for preparing a heterogeneous catalyst for polymerization of olefins, said catalyst comprising a zirconium chloride compound of the formula ZrYn wherein Y is chlorine and n is 2 or 3, on a solid silica support, which comprises:

a) vaporizing a zirconium chloride compound;

b) introducing the vapor of said zirconium chloride compound into a reaction chamber, wherein said vapor is reacted with a solid silica support at a temperature from about 250° C. to about 350° C. in order to bind said zirconium chloride compound to said support;

c) removing any zirconium chloride compound not bound to said support as well as any volatile reaction products emanating from the reaction between said zirconium chloride compound and said support from said reaction chamber in the vapor phase; and d) optionally treating the product obtained from reacting said zirconium chloride compound and said support with an organic aluminum compound to increase the catalytic activity of said catalyst, and wherein the vapor pressure of said zirconium chloride compound is maintained sufficiently high and the duration of the reaction with said support material is sufficiently long so as to provide at least an equal amount of said zirconium chloride compound with respect to the number of available bonding sites of said support.

\* \* \* \* \*